United States Patent
Yamaga (10) Patent No.: US 9,533,664 B2
(45) Date of Patent: Jan. 3, 2017

(54) VACUUM BOOSTER, BRAKE SYSTEM EQUIPPED WITH THE VACUUM BOOSTER, AND METHOD OF MANUFACTURING PLATE PLUNGER FOR VACUUM BOOSTER

(71) Applicant: Bosch Corporation, Tokyo (JP)

(72) Inventor: Hiroyuki Yamaga, Saitama-ken (JP)

(73) Assignee: Bosch Corporation, Tokyo (JP)

( * ) Notice: Subject to any disclaimer, the term of this patent is extended or adjusted under 35 U.S.C. 154(b) by 0 days.

(21) Appl. No.: 14/813,656

(22) Filed: Jul. 30, 2015

(65) Prior Publication Data

US 2015/0336550 A1 Nov. 26, 2015

Related U.S. Application Data

(62) Division of application No. 13/703,569, filed as application No. PCT/JP2011/003032 on May 31, 2011, now abandoned.

(30) Foreign Application Priority Data

Jun. 23, 2010 (JP) .................................. 2010-142252

(51) Int. Cl.
*B60T 13/569* (2006.01)
*B60T 13/565* (2006.01)
(Continued)

(52) U.S. Cl.
CPC .............. *B60T 13/565* (2013.01); *B23P 15/10* (2013.01); *B60T 13/569* (2013.01); *B60T 13/575* (2013.01);
(Continued)

(58) Field of Classification Search
USPC ....... 303/6.01; 91/367–369.3, 376 R; 29/888
See application file for complete search history.

(56) References Cited

U.S. PATENT DOCUMENTS 4,813,337 A * 3/1989 Endo ..................... B60T 13/563
91/369.2
5,337,650 A * 8/1994 Uyama .................. B60T 13/575
91/376 R
(Continued)

FOREIGN PATENT DOCUMENTS

JP 4215558 8/1992
JP 6227386 8/1994

OTHER PUBLICATIONS

International Search Report for Application No. PCT/JP2011/003032 dated Aug. 30, 2011 (English Translation, 2 pages).

*Primary Examiner* — Vishal Sahni
(74) *Attorney, Agent, or Firm* — Michael Best & Friedrich LLP (57) ABSTRACT

A method of manufacturing a plate plunger with which a reaction disc comes into contact and which determines a servo ratio of a vacuum booster, the plate plunger manufacturing method comprising primarily processing a plate plunger base material in such a way that an outer peripheral diameter of a reaction disc contact surface of the plate plunger becomes equal to or greater than an outer peripheral diameter, and forming the reaction disc contact surface of the plate plunger in such a way that it has an outer peripheral diameter corresponding to a desired servo ratio by secondarily processing a servo ratio determination surface.

14 Claims, 6 Drawing Sheets

(51) Int. Cl.
*B23P 15/10* (2006.01)
*B60T 13/575* (2006.01)
(52) U.S. Cl.
CPC ....... *Y10T 29/4925* (2015.01); *Y10T 29/49229* (2015.01)

(56) References Cited

U.S. PATENT DOCUMENTS

| | | | | |
|---|---|---|---|---|
| 6,044,750 | A * | 4/2000 | Eick | B60T 13/72 91/367 |
| 6,092,453 | A | 7/2000 | Preker | |
| 6,295,915 | B1 * | 10/2001 | Watanabe | B60T 13/52 91/369.2 |
| 6,332,391 | B1 | 12/2001 | Ikeda et al. | |
| 6,516,703 | B2 | 2/2003 | Stegmaier et al. | |
| 6,826,999 | B2 * | 12/2004 | Verbo | B60T 13/57 91/369.2 |
| 2002/0069751 | A1 | 6/2002 | Inoue et al. | |
| 2003/0121406 | A1 * | 7/2003 | Takasaki | B60T 13/575 91/369.3 |

* cited by examiner

PRIOR ART

VACUUM BOOSTER, BRAKE SYSTEM EQUIPPED WITH THE VACUUM BOOSTER, AND METHOD OF MANUFACTURING PLATE PLUNGER FOR VACUUM BOOSTER

CROSS-REFERENCE TO RELATED APPLICATIONS

This application is a divisional of U.S. patent application Ser. No. 13/703,569, filed Dec. 11, 2012, which is a 35 USC 371 application of PCT/JP2011/003032 filed on May 31, 2011, and claims priority to Japanese Patent Application No. 2010-142252, filed Jun. 23, 2010, the entire contents of each of which are incorporated herein in its entirety.

BACKGROUND OF THE INVENTION

The present invention relates to the technical field of a vacuum booster that uses vacuum to boost an input by a predetermined servo ratio and generate a large output, a brake system that is equipped with the vacuum booster as a brake booster, and a method of manufacturing a plate plunger that is used in a vacuum booster and determines a predetermined servo ratio together with a reaction disc. In the description of the specification of the present invention, front-and-rear direction relationships will be described with "front" representing the direction in which an input shaft moves when the vacuum booster is operative and "back" representing the direction in which the input shaft returns when operation is cancelled.

In brake systems of automobiles such as passenger cars, many vacuum boosters that use vacuum to boost an input by a predetermined servo ratio and generate a large output are used. As such vacuum boosters, many vacuum boosters in which the predetermined servo ratio is set by a reaction disc and a plate plunger are known (e.g., see JP-A-63-269768).

Figure 4:
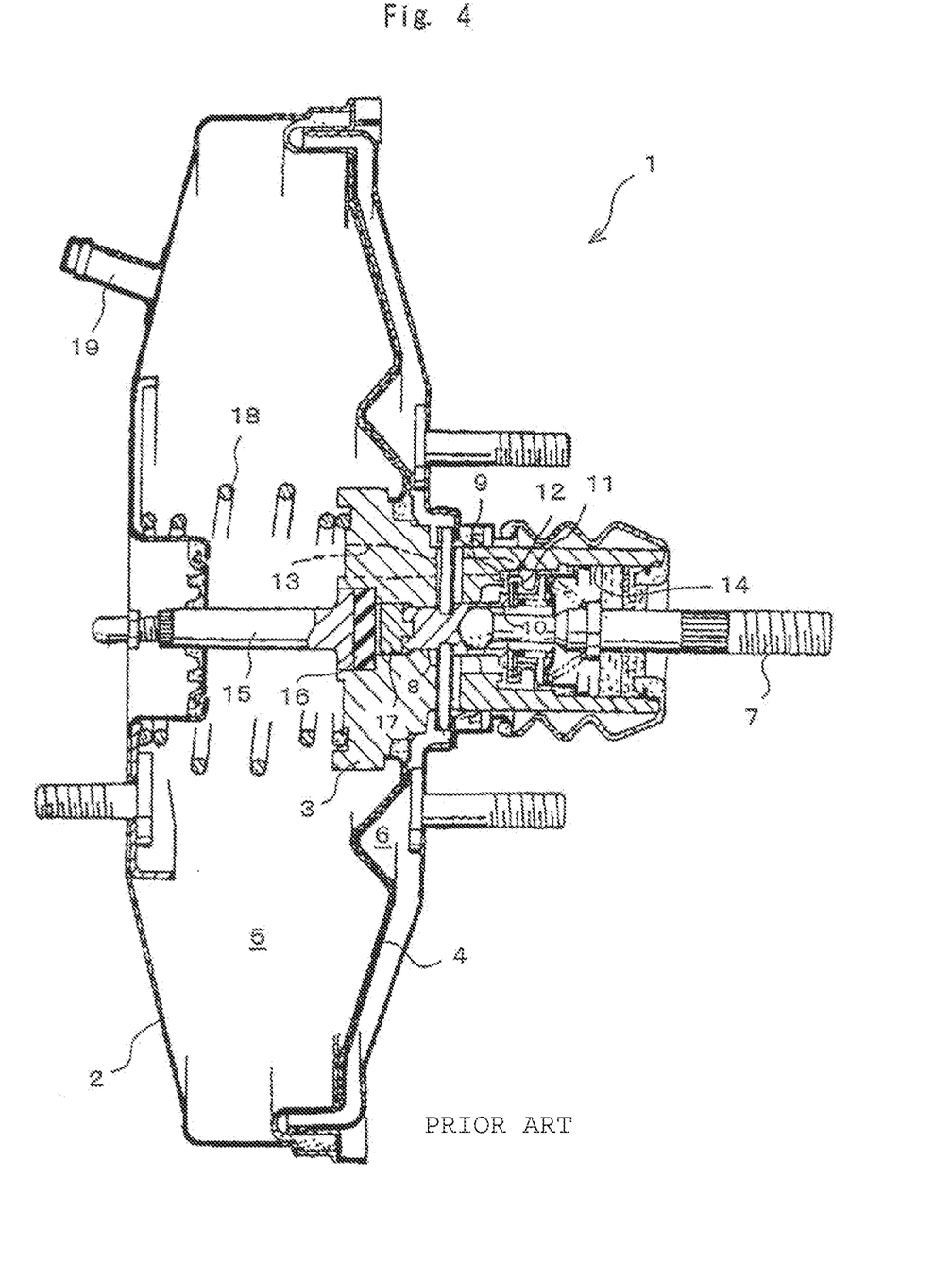
FIG. 4 is a longitudinal sectional view showing a vacuum booster described in JP-A-63-269768.

FIG. 4 is a longitudinal sectional view showing a vacuum booster described in JP-A-63-269768. In FIG. 4, 1 is the vacuum booster, 2 is a shell that forms a predetermined interior space, 3 is a valve body that is partially and air-tightly disposed in such a way as to be capable of sliding inside the shell 2, 4 is a power piston that is disposed between the shell 2 and the valve body 3 and air-tightly partitions the interior space of the shell 2, 5 is a constant pressure chamber that is demarcated by the power piston 4 and to which vacuum is always introduced, 6 is a variable pressure chamber that is demarcated by the power piston 4 and to which vacuum is introduced when the vacuum booster 1 is not operative and to which atmosphere is introduced when the vacuum booster 1 is operative, 7 in an input shaft to which an input is applied from the outside, 8 is a valve plunger that is supported in such a way as to be capable of sliding in the valve body 3 and is operated by the input shaft 7, 9 is a vacuum valve seat that is disposed in the valve body 3, 10 is an atmosphere valve seat that is disposed in the valve plunger 8, 11 is a valve element that is disposed in the valve body 3 and is disposed in such a way as to be capable of being seated in and unseated from the vacuum valve seat 9 and the atmosphere valve seat 10, 12 is a control valve comprising the vacuum valve seat 9 and the atmosphere valve seat 10 and the valve element 11, 13 is a vacuum introduction passageway that introduces vacuum to the variable pressure chamber 6 through the constant pressure chamber 5, 14 is an atmosphere introduction passageway that introduces atmosphere to the variable pressure chamber 6, 15 is an output shaft that is air-tightly disposed in such a way as to be capable of sliding in the shell 2 and outputs to the outside because of the operation of the power piston 4, 16 is a disc-shaped reaction disc that is pushed by a reaction force from the output shaft 15 and elastically deforms when the vacuum booster 1 is operative, 17 is a plate plunger that is supported in such a way as to be attachable to and detachable from the valve plunger 8 and with which the reaction disc 16 that has elastically deformed comes into contact, 18 is a return spring that always energizes the valve body 3 in the inoperative direction, and 19 is a vacuum introduction port that introduces vacuum to the constant pressure chamber 5.

Figure 5:
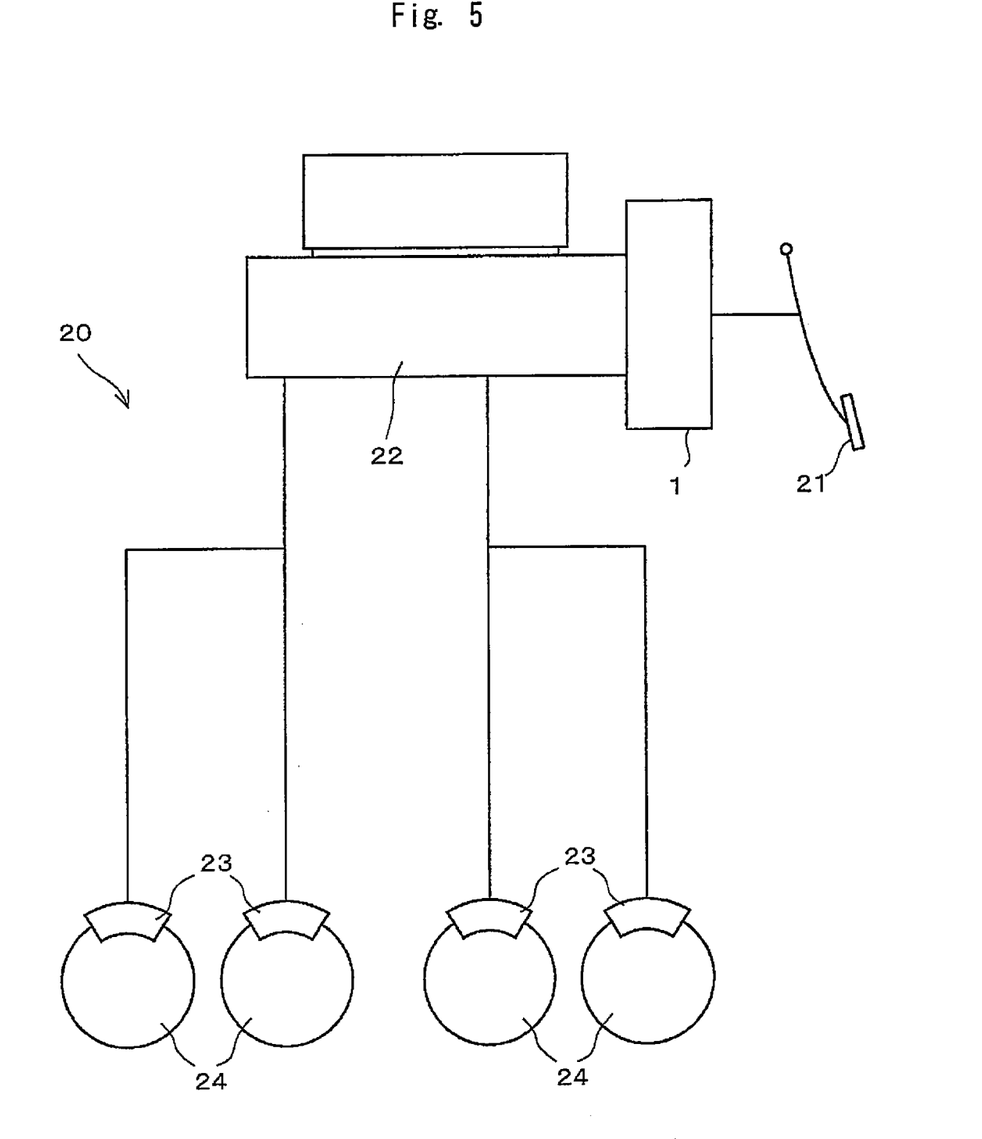
FIG. 5 is a diagram schematically showing a brake system in which the vacuum booster is used as a brake booster.

This conventional vacuum booster 1 is used as a brake booster in a brake system shown in FIG. 5, for example. In FIG. 5, 20 is the brake system, 21 is a brake pedal that operates the input shaft 7 of the vacuum booster 1, 22 is a tandem master cylinder that is operated by the output of the vacuum booster 1, 23 is brake cylinders that generate brake force, and 24 are wheels.

The operation of the vacuum booster 1 and the brake system 20 of the conventional example will be described.

When the brakes are inoperative, the vacuum booster 1 is in the inoperative state shown in FIG. 4 and the input shaft 7 is in a backward limit position. Further, normally, a predetermined vacuum is being introduced to the constant pressure chamber 5 through the vacuum introduction port 19. Additionally, in the inoperative state of the vacuum booster 1, the valve element 11 is seated in the atmosphere valve seat 10 and unseated from the vacuum valve seat 9. Consequently, the control valve 12 places the variable pressure chamber 6 in communication with the constant pressure chamber 5 via the vacuum introduction passageway 13 and cuts off the variable pressure chamber 6 from atmosphere. Because of this, vacuum is also being introduced to the variable pressure chamber 6. Moreover, the reaction disc 16 and the plate plunger 17 are apart from each other.

When the brake pedal 21 is depressed, the input shaft 7 moves forward and the valve plunger 8 moves forward. When this happens, the valve element 11 becomes seated in the vacuum valve seat 9, and the atmosphere valve seat 10 moves away from the valve element 11. That is, the control valve 12 cuts off the variable pressure chamber 6 from the constant pressure chamber 5 and places the variable pressure chamber 6 in communication with atmosphere via the atmosphere introduction passageway 14. Consequently, atmosphere (air) is introduced to the variable pressure chamber 6 and a pressure difference arises between the variable pressure chamber 6 and the constant pressure chamber 5. Because of this pressure difference, the power piston 4 operates and causes the valve body 3 to move forward counter to the energizing force of the return spring 8. The reaction disc 16 and the output shaft 15 move forward because of the forward movement of the valve body 3, and the vacuum booster 1 operates. The forward movement of the output shaft 15 causes unillustrated pistons of the master cylinder 22 to move forward. However, the master cylinder 22 substantially does not generate hydraulic pressure because of the loss stroke of the brake system 20. At this time, the pedal force of the brake pedal 21—that is, the input of the vacuum booster 1—is small, and the reaction disc 16 and the plate plunger 17 are not in contact with each other.

When the pedal force—that is, the input of the vacuum booster 1—increases until the loss stroke of the brake system 20 ceases, the master cylinder 22 generates hydraulic pressure. The brake cylinders 23 generate brake force because of the hydraulic pressure of the master cylinder 22, and brakes are applied to each of the wheels 24.

Meanwhile, a reaction force is transmitted via the output shaft 15 to the reaction disc 16 by the hydraulic pressure of the master cylinder 22. For this reason, the reaction disc 16 elastically deforms and expands toward the plate plunger 17. Additionally, when the input applied to the input shaft 7 increases to a predetermined magnitude, the elastically deformed reaction disc 16 comes into contact with the plate plunger 17. Because of this, the reaction force is transmitted via the plate plunger 17, the valve plunger 8, and the input shaft 7 to the brake pedal 21, so the driver becomes aware of the operation of the brakes.

Figure 6:
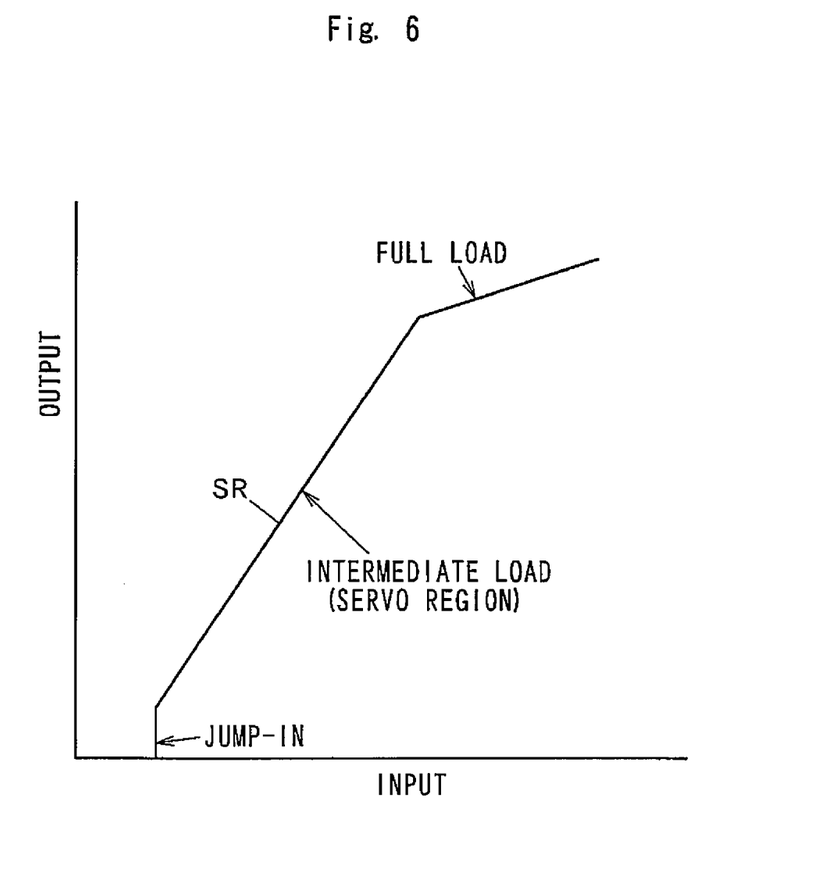
FIG. 6 is a diagram showing an input/output characteristic line diagram of the conventional vacuum booster.

In this way, the vacuum booster 1 substantially does not output with respect to the input (pedal force) while the reaction disc 16 is not in contact with the plate plunger 17 and substantially outputs when the reaction disc 16 is in contact with the plate plunger 17. At this time, as shown in FIG. 6, the output of the vacuum booster 1 jumps in to a predetermined magnitude.

While the vacuum booster 1 is in operation, the valve body 3 moves forward, so the valve element 11 gradually approaches the atmosphere valve seat 10. Additionally, in the intermediate load state before the variable pressure chamber 6 reaches atmospheric pressure, the valve element 11 is seated in both the atmosphere valve seat 10 and the vacuum valve seat 9, and the control valve 12 enters a balanced state in which it cuts off the variable pressure chamber 6 from both the constant pressure chamber 5 and atmosphere. In this balanced state, the output of the vacuum booster 1 becomes an output in which the input has been boosted by the servo ratio. That is, as shown in FIG. 6, in the intermediate load state after the jump-in, the vacuum booster 1 exhibits an input/output characteristic that becomes an output in which the input has been boosted by a servo ratio SR. In that case, the servo ratio SR is given by the ratio of the area of contact between the output shaft 15 and the reaction disc 16 with respect to the area of contact between the plate plunger 17 and the reaction disc 16.

When the brake pedal 21 is released, the input shaft 7 moves backward, the vacuum valve seat 9 moves away from the valve element 11, and the atmosphere valve seat 10 becomes seated on the valve element 10. When this happens, the air that was introduced to the variable pressure chamber 6 flows to the constant pressure chamber 5 via an opening between the vacuum valve seat 9 and the valve element 11 and the vacuum introduction passageway 13, and the air that has flowed to the constant pressure chamber 5 flows out from the constant pressure chamber 5 through the vacuum introduction port 19. Because of this, the pressure in the variable pressure chamber 6 drops, and the power piston 4, the output shaft 5, the valve body 3, the reaction disc 16, the plate plunger 17, and the valve plunger 8 move backward because of the energizing force of the return spring 18. When this happens, the pistons in the master cylinder 22 also move backward and the hydraulic pressure in the master cylinder 22 gradually drops and ceases. Additionally, the valve body 3 and the valve plunger 8 are regulated in their backward limit positions, the vacuum booster 1 enters the inoperative state shown in FIG. 4, and the brakes of the wheels 24 are released.

When the variable pressure chamber 6 reaches atmospheric pressure when the vacuum booster 1 is operative, the vacuum booster 1 reaches a full load state that becomes an output in which the input is not boosted by the servo ratio SR.

There has been proposed a vacuum booster which, by fitting and supporting the plate plunger 17 in the valve plunger in such a way as to be attachable thereto and detachable therefrom and giving the shape of the portion of the plate plunger 17 that comes into contact with the reaction disc 16 the shape of a projection or the shape of an inclined surface, makes the servo ratio SR and the jump-in amount in the input-output characteristic line diagram of the vacuum booster 1 changeable in a variety of ways and can suitably accommodate different input/output characteristics of vacuum boosters (see Japanese Patent No. 2,959,585). The reference signs used for the configural elements are not the reference signs given in JP-A-63-269768 and Japanese Patent No. 2,959,585.

SUMMARY OF THE INVENTION

Incidentally, the plate plunger 17 that determines the servo ratio SR of the vacuum booster 1 is manufactured out of metal using a mold. A variety of servo ratios SR (e.g., 5, 5.1, 5.2, 5.3, 5.4, 5.5, etc.) that are slightly different depending on the vacuum booster 1 are required for the servo ratio SR of the vacuum booster 1 such as described in Japanese Patent No. 2,959,585. Conventionally, when manufacturing the plate plungers 17 with a variety of different servo ratios SR, the plate plungers 17 are manufactured by making molds for each of the plate plungers 17 with the variety of different servo ratios SR.

However, when molds are made for each of the plate plungers 17 with the variety of different servo ratios SR in this way, there is the problem that not only are the manufacture of the plate plungers 17 and parts management both troublesome but the cost is high. For this reason, it is difficult to efficiently and flexibly accommodate the requirements of the plate plungers 17 with the different servo ratios SR.

The present invention has been made in view of these circumstances, and it is an object thereof to provide a vacuum booster that is equipped with a plate plunger that can easily and inexpensively accommodate a variety of servo ratios, a brake system that is equipped with the vacuum booster, and a plate plunger manufacturing method with which a plate plunger can be easily and inexpensively manufactured.

In order to solve the above problem, a vacuum booster of the present invention includes at least: an input shaft to which an input is applied; a control valve that is operated by the input shaft; a power piston that operates on atmospheric air introduced by the operation of the control valve; an output shaft that puts out an output in which the input has been boosted by a servo ratio by the operation of the power piston; a reaction disc to which a reaction force of the output of the output shaft is transmitted and which elastically deforms; and a plate plunger with which the reaction disc that has elastically deformed comes into contact to transmit the reaction force to the input shaft and which determines the servo ratio, wherein the plate plunger has, on a corner portion between its outer peripheral surface and its surface that opposes the reaction disc, a servo ratio determination surface that is formed by an inclined surface and determines the servo ratio, and the servo ratio determination surface comprises a reaction disc contact surface that determines the servo ratio and a reaction disc non-contact surface.

Further, in the vacuum booster of the present invention, the plate plunger is configured by a plate plunger base material in which an outer peripheral diameter of the reaction disc contact surface has been primarily processed to be equal to or greater than an outer peripheral diameter corresponding to the smallest servo ratio among a variety of different servo ratios and in which the servo ratio determination surface has been secondarily processed.

Moreover, in the vacuum booster of the present invention, the primary processing is performed by mold forming or cut forming, and the secondary processing is performed by cutting or grinding.

Moreover, a brake system of the present invention includes at least: a brake pedal; a brake booster that boosts the pedal force of the brake pedal by a predetermined servo ratio and outputs the boosted pedal force; a master cylinder that operates on the output of the brake booster and generates hydraulic pressure; and brake cylinders that generate brake force with the hydraulic pressure generated in the master cylinder to apply brakes to wheels, wherein the brake booster is the vacuum booster of the present invention.

A plate plunger manufacturing method of the present invention is a method of manufacturing a plate plunger with which a reaction disc comes into contact and which determines a servo ratio of a vacuum booster, the plate plunger manufacturing method including: primarily processing a plate plunger base material in such a way that an outer peripheral diameter of a reaction disc contact surface of the plate plunger with which the reaction disc comes into contact becomes equal to or greater than an outer peripheral diameter corresponding to the smallest servo ratio among a variety of different servo ratios; and forming the reaction disc contact surface of the plate plunger in such a way that it has an outer peripheral diameter corresponding to a desired servo ratio by secondarily processing a servo ratio determination surface that determines the servo ratio on a corner portion between an outer peripheral surface of the plate plunger base material and a surface of the plate plunger base material that opposes the reaction disc.

Further, the plate plunger manufacturing method of the present invention further includes secondarily processing the servo ratio determination surface in such a way that the servo ratio becomes the smallest servo ratio among the variety of different servo ratios to thereby obtain the plate plunger base material, and using the plate plunger base material as is as the plate plunger in the case of obtaining a plate plunger with the smallest servo ratio and, in the case of obtaining a plate plunger with a larger servo ratio than the smallest servo ratio, forming the servo ratio determination surface of the plate plunger base material by further secondary processing to thereby obtain a plate plunger with the desired servo ratio.

Moreover, in the plate plunger manufacturing method of the present invention, the primary processing is performed by mold forming or cut forming, and the secondary processing is performed by cutting or grinding.

According to the vacuum booster pertaining to the present invention configured in this way, the plate plunger has, on a corner portion between its outer peripheral surface and its surface that opposes the reaction disc, the servo ratio determination surface that is formed by an inclined surface and determines the servo ratio. In that case, the servo ratio determination surface comprises the reaction disc contact surface that determines the servo ratio and the reaction disc non-contact surface. Because of this, by just changing the outer peripheral diameter of the reaction disc contact surface that determines the servo ratio, it becomes possible to obtain plate plungers with a variety of different servo ratios without having to change the dimensions of other portions of the plate plunger. Consequently, the servo ratio of the vacuum booster can be made to efficiently and flexibly accommodate the requirements of a variety of different servo ratios and it becomes possible to inexpensively manufacture the vacuum booster.

Further, according to the brake system pertaining to the present invention, the brake system can efficiently and flexibly accommodate different servo ratios because it uses the vacuum booster of the present invention, and thus there is a greater degree of freedom in designing brake characteristics.

Moreover, according to the plate plunger manufacturing method pertaining to the present invention, the disc-shaped plate plunger base material, which has the servo ratio determination surface comprising an inclined surface and in which the outer peripheral diameter of the reaction disc contact surface of the servo ratio determination surface with which the reaction disc that has elastically deformed comes into contact and which determines the servo ratio has been formed in such a way as to be equal to or greater than the outer peripheral diameter that corresponds to the smallest servo ratio among the variety of different servo ratios, is primarily processed by mold forming or cut forming. Further, by secondarily processing the servo ratio determination surface by cutting or grinding, the plate plunger base material is manufactured. Additionally, by further secondarily processing just the servo ratio determination surface of the plate plunger base material, the outer peripheral diameter of the reaction disc contact surface is formed into an outer peripheral diameter corresponding to the desired servo ratio. At this time, other portions of the plate plunger base material are not processed and their dimensions are not changed. Consequently, it suffices to manufacture a common plate plunger base material with respect to a variety of different servo ratios, so plate plungers with a variety of different servo ratios can be easily manufactured and parts management also becomes easy.

Moreover, by using the common plate plunger base material with respect to plate plungers with a variety of different servo ratios, it becomes possible to make do with one mold for manufacturing the plate plunger base material as the mold for manufacturing the plate plunger. Because of this, the cost of the plate plunger can be reduced.

Moreover, by using, as the common plate plunger base material, the plate plunger base material in which the outer peripheral diameter of the contact surface has been formed into the outer peripheral diameter corresponding to the smallest servo ratio among the variety of different servo ratios, the plate plunger base material itself can be used for the plate plunger that sets the smallest servo ratio. Consequently, when manufacturing the plate plunger that sets the smallest servo ratio, additional secondary processing of the plate plunger base material becomes unnecessary. Because of this, the plate plunger can be manufactured even more easily and the cost of the plate plunger can be reduced even more efficiently.

From the above, according to the plate plunger manufacturing method pertaining to the present invention, it becomes possible to efficiently and flexibly accommodate the requirements of plate plungers with a variety of different servo ratios.

BRIEF DESCRIPTION OF THE DRAWINGS

FIG. 2A to FIG. 2C are enlarged views showing portion IIA in FIG. 1 and describe a method of manufacturing plate plungers with different servo ratios of the present invention;

DETAILED DESCRIPTION

An embodiment of the present invention will be described below using the drawings.

Figure 1:
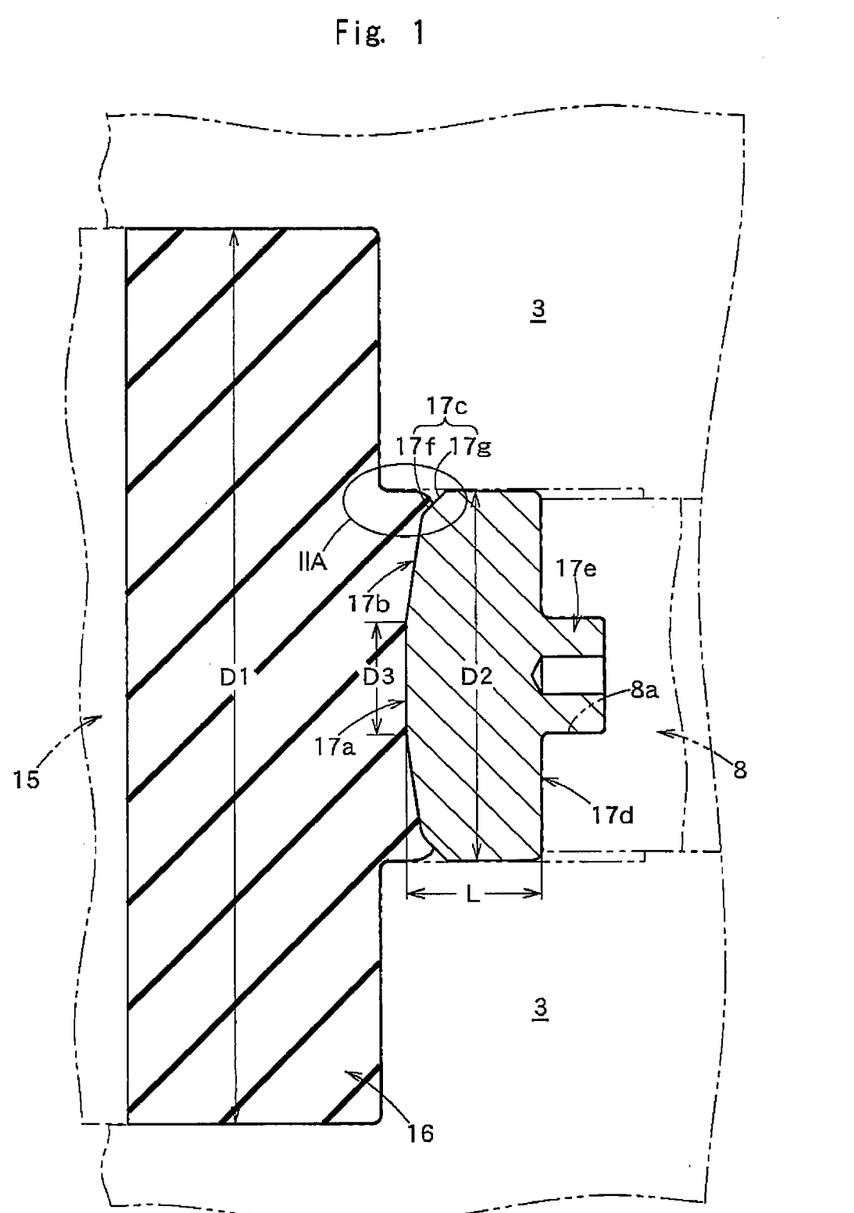
FIG. 1 is a partially enlarged sectional view partially showing an example of an embodiment of a vacuum booster pertaining to the present invention.

FIG. 1 is a partially enlarged sectional view partially showing an example of an embodiment of a vacuum booster pertaining to the present invention. In the description of the embodiment below, the vacuum booster of the present invention will be described as being applied to a brake booster in a brake system. Further, with respect to configural elements of the present invention that are the same as the configural elements of the vacuum booster and the brake system of the conventional example mentioned above, detailed description thereof will be omitted by giving the same reference signs thereto.

The vacuum booster 1 of this example is basically equipped with substantially the same configuration as that of a conventional general vacuum booster such as the vacuum booster having the plate plunger described in JP-A-63-269768 mentioned above, for example. Consequently, in the vacuum booster 1 of this example, in regard to basic configural portions and basic operations that are the same as those of the conventional vacuum booster, detailed description thereof will be omitted.

Figure 2A:
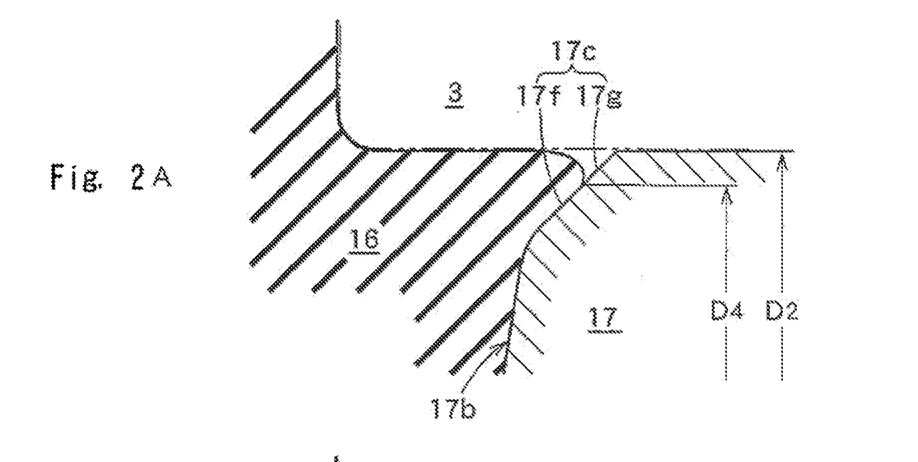

As shown in FIG. 1 and FIG. 2A, the plate plunger 17 of the vacuum booster 1 of this example is formed in a disc shape having an outer peripheral diameter D2. In that case, in this plate plunger 17, an opposing surface that opposes the disc-shaped reaction disc 16 that has an outer peripheral diameter D1 is formed by: a flat and circular contact surface 17a that is positioned in the center and has an outer peripheral diameter D3; a frustoconical contact surface 17b that is formed continuously with the outer peripheral edge of the circular contact surface 17b; and a frustoconical servo ratio determination surface 17c that is continuous with the outer peripheral edge of the frustoconical contact surface 17b and is inclined by a greater angle of inclination (e.g., 45°) than the frustoconical contact surface 17b. Consequently, the mutual relationship between the outer peripheral diameters D1, D2, and D3 is set to D1>D2>D3.

Figure 3:
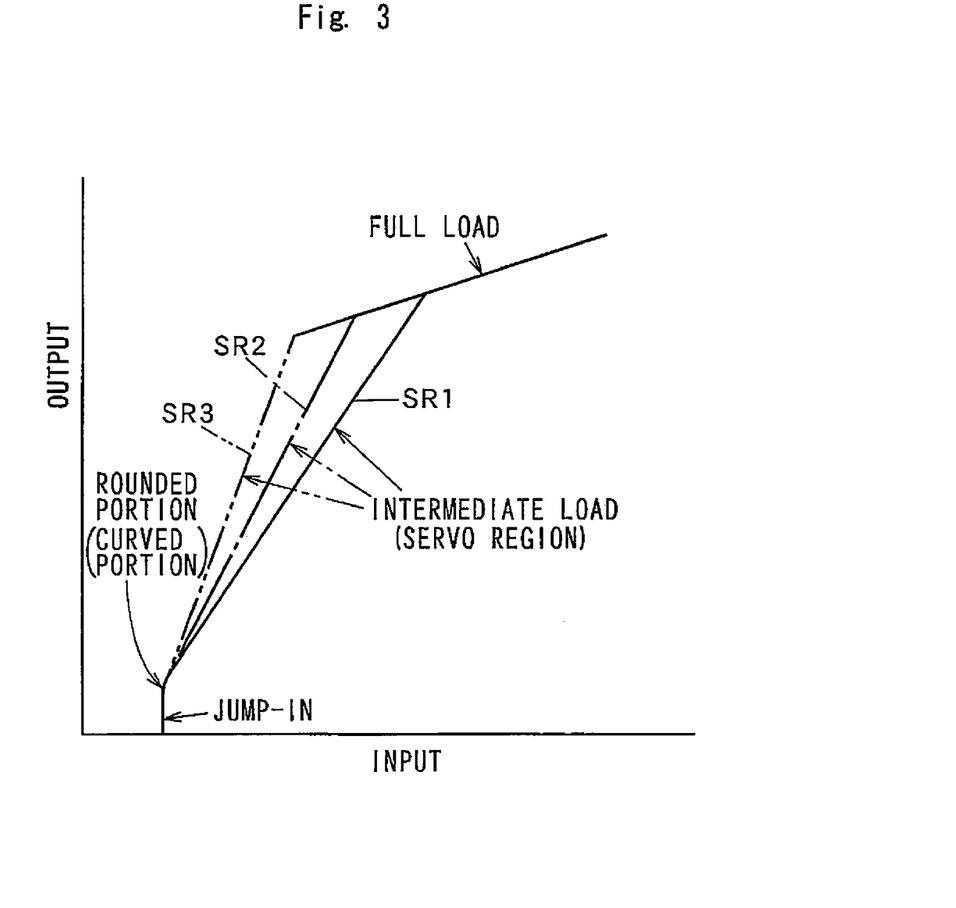
FIG. 3 is a diagram showing an input/output characteristic line diagram corresponding to the variety of different servo ratios shown in FIG. 2A to FIG. 2C.

The circular contact surface 17a is a surface with which the elastically deformed and expanded reaction disc 16 first comes into contact with at the time of the jump-in. Further, the frustoconical contact surface 17b is a surface with which at the time of the jump-in the reaction disc 16 that expands comes into contact following the circular contact surface 17a. Because of the frustoconical contact surface 17b, as shown in FIG. 3, there is formed a curved rounded portion that smoothly moves the input/output characteristic of the vacuum booster 1 from the jump-in to the intermediate load state. Moreover, the servo ratio determination surface 17c is a surface with which the reaction disc 16 that further expands comes into contact following the frustoconical contact surface 17b. In that case, the servo ratio determination surface 17c comprises a reaction disc contact surface 17f with which the expanded reaction disc 16 comes into contact and a reaction disc non-contact surface 17g with which the expanded reaction disc 16 does not come into contact. As mentioned above, the area of contact between the plate plunger 17 and the reaction disc 16 is related to the servo ratio SR. Consequently, the reaction disc contact surface 17f is one factor that determines the servo ratio SR. The servo ratio SR in the example shown in FIG. 1 and FIG. 2A is $(D1/D4)^2$ when D4 represents the outer peripheral diameter of the reaction disc contact surface 17f (an effective diameter that determines the servo ratio SR).

A hollow cylindrical or solid cylindrical projecting support portion 17e is disposed on a surface 17d of the plate plunger 17 on the opposite side of the reaction disc 16. Additionally, the plate plunger 17 is supported in such a way as to be attachable to and detachable from the valve plunger 8 as a result of the projecting support portion 17e being fitted into a fitting support hole 8a formed in the front end portion of the valve plunger 8. In that case, it is preferred that the front end of the valve plunger 8 be in contact with the surface 17d of the plate plunger 17, but there is no being limited to this.

Figure 2B:
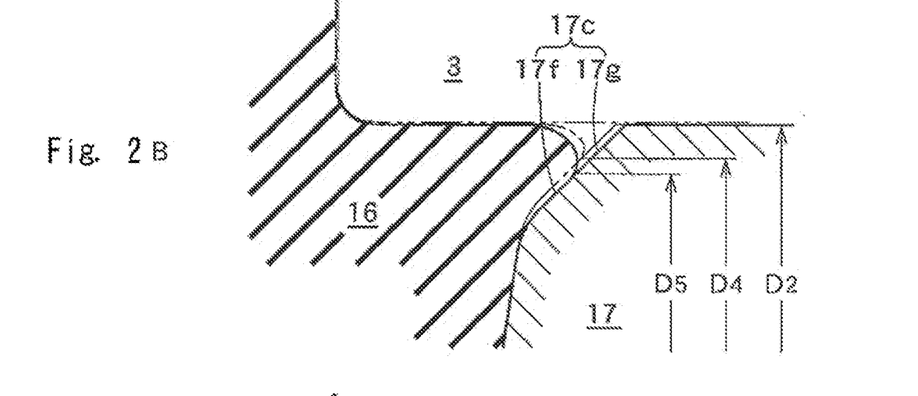
Figure 2C:
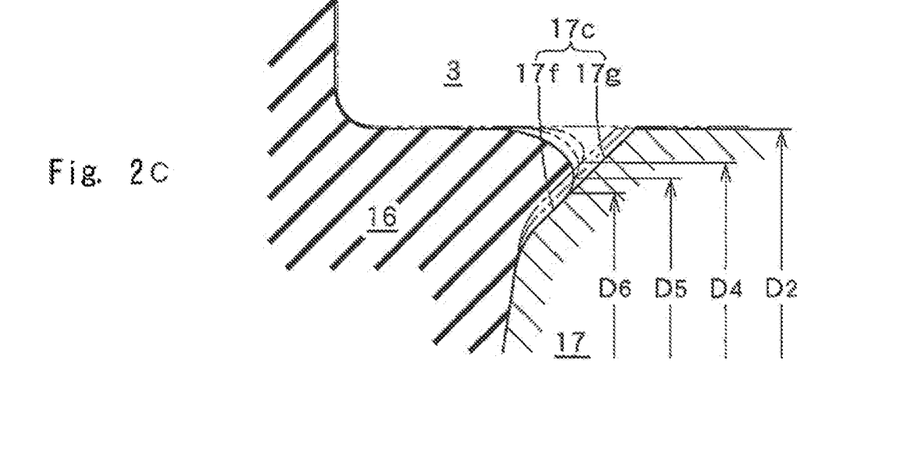

Incidentally, the plate plunger 17 of the plate plunger of this example is manufactured from a plate plunger base material shared in common with plate plungers 17 used in other vacuum boosters with servo ratios SR that are slightly different. A method of manufacturing the plate plunger 17 will be described below. That is, as shown in FIG. 2A to FIG. 2C for example, the method of manufacturing the plate plunger 17 is configured in such a way that, with respect to plate plungers 17 of vacuum boosters 1 with different servo ratios SR, the outer peripheral diameter D2 of the plate plunger 17, the outer peripheral diameter D3 of the circular contact surface 17a, a length L between the surface 17d and the circular contact surface 17a of the plate plunger 17, and the shape and dimensions of the projecting support portion 17e are all set the same but the outer peripheral diameter of the reaction disc contact surface 17f of the servo ratio determination surface 17c is changed to outer peripheral diameters D4, D5, and D6 corresponding to the different servo ratios SR. In the examples shown in FIG. 2A to FIG. 2C, the plate plunger base material is used to manufacture plate plungers 17 in which the outer peripheral diameter D4 of the reaction disc contact surface 17f shown in FIG. 2A is the largest and the outer peripheral diameter D6 of the reaction disc contact surface 17f shown in FIG. 2C is the smallest (D1>D2>D4>D5>D6>D3).

In order to change the outer peripheral diameter D4 of the reaction disc contact surface 17f in correspondence to the different servo ratios SR, in the plate plunger manufacturing method of this example, first, the plate plunger base material in which the outer peripheral diameter D2 of the plate plunger 17, the outer peripheral diameter D3 of the circular contact surface 17a, the length L between the surface 17d and the circular contact surface 17a of the plate plunger 17, and the shape and dimensions of the projecting support portion 17e are set the same with respect to plate plungers 17 of vacuum boosters with different servo ratios SR as mentioned before is primarily processed by mold forming or cut forming. The plate plunger base material is manufactured using a mold in the same way as in a conventional plate plunger manufacturing method.

Next, a plate plunger base material in which the outer peripheral diameter D4 of the reaction disc contact surface 17f that results in the smallest servo ratio SR1 shown in FIG. 3 among the different servo ratios SR is the largest is manufactured. For that purpose, first, a plate plunger base material in which the servo ratio determination surface 17c has been formed in such a way that the reaction disc contact surface 17f is equal to or greater than the largest outer peripheral diameter D4 is manufactured. Then, the plate plunger base material in which the servo ratio determination surface 17c has been formed is incorporated in the vacuum booster 1 as the plate plunger 17 and the servo ratio SR is measured. The reaction disc contact surface 17f is equal to or greater than the largest outer peripheral diameter D4, so the measured servo ratio SR becomes smaller than the desired smallest servo ratio SR1 of the plate plunger base material. Therefore, the servo ratio determination surface 17c of the plate plunger base material is secondarily processed a slight predetermined amount by cutting or grinding to form a new servo ratio determination surface 17c. The plate plunger base material is incorporated in the vacuum booster 1 as the plate plunger 17 and the servo ratio SR is measured. The forming of the servo ratio determination surface 17c and the measuring of the servo ratio SR are repeated several times to manufacture a plate plunger base material in which the outer peripheral diameter D4 of the reaction disc contact surface 17f that results in the smallest servo ratio SR1 is the largest.

Additionally, in the case of obtaining a plate plunger 17 with the smallest servo ratio SR1, a plate plunger base material that is the plate plunger 17 shown in FIG. 2A is used as is as the plate plunger. Further, in the case of obtaining a plate plunger 17 with a larger servo ratio SR than the smallest servo ratio SR1 shown in FIG. 2A, as shown in FIG. 2B, the servo ratio determination surface 17c of the plate plunger 17 shown in FIG. 2A is secondarily processed a slight predetermined amount by cutting or grinding in the same way as described above (in FIG. 2B, the servo ratio determination surface 17c depicted in FIG. 2A is indicated by a long dashed short dashed line). In this way, using the plate plunger 17 (that is, the plate plunger base material) shown in FIG. 2A, the plate plunger 17 shown in FIG. 2B that has the servo ratio SR2 in which the servo ratio SR is larger than that of the plate plunger 17 shown in FIG. 2A and FIG. 3 is manufactured.

Further, in the case of manufacturing a plate plunger 17 that results in the largest servo ratio SR3 shown in FIG. 2C and FIG. 3, in the same way as the method of manufacturing the plate plunger 17 shown in FIG. 2B, the plate plunger 17 (that is, the plate plunger base material) shown in FIG. 2A is used to manufacture a plate plunger 17 that results in the largest servo ratio SR3 in the same way as mentioned before (in FIG. 2C), the servo ratio determination surface 17c depicted in FIG. 2A is indicated by a long dashed short dashed line and the servo ratio determination surface 17c depicted in FIG. 2B is indicated by a long dashed double-short dashed line).

Additionally, the input/output characteristics of the vacuum booster devices 1 using the plate plungers 17 shown in FIG. 2A to FIG. 2C are represented by the input/output characteristic line diagram shown in FIG. 3. That is, the input/output characteristic of the vacuum booster 1 using the plate plunger 17 shown in FIG. 2A becomes the characteristic indicated by the solid line in FIG. 3, and the servo ratio SR in this case is the smallest SR1 as mentioned before. Further, the input/output characteristic of the vacuum booster 1 using the plate plunger 17 shown in FIG. 2B becomes the characteristic indicated by the long dashed short dashed line in FIG. 3, and the servo ratio SR in this case is SR2, which is larger than SR1 as mentioned before (SR1<SR2). Moreover, the input/output characteristic of the vacuum booster 1 using the plate plunger 17 shown in FIG. 2C becomes the characteristic indicated by the long dashed double-short dashed line in FIG. 3, and the servo ratio SR in this case is the largest SR3, which is larger than SR2 as mentioned before (SR1<SR2<SR3).

In this way, the plate plunger manufacturing method of this example uses the plate plunger base material in which the outer peripheral diameter of the reaction disc contact surface 17f of the servo ratio determination surface 17c that determines the servo ratio SR has been set to the largest outer peripheral diameter D4 that sets the smallest servo ratio SR1 among the different servo ratios SR and in which common portions unrelated to the servo ratio SR have been set to common shapes and sizes. Additionally, by secondarily processing the servo ratio determination surface 17c of the plate plunger base material by cutting or grinding, the outer peripheral diameter of the reaction disc contact surface 17f is set to an outer peripheral diameter (D5, D6, etc.) corresponding to the desired servo ratio SR.

According to the vacuum booster 1 of this example, the plate plunger 17 has, on a corner portion between its outer peripheral surface and its surface that opposes the reaction disc 16, the servo ratio determination surface 17c that is formed by an inclined surface and determines the servo ratio SR. In that case, the servo ratio determination surface 17c comprises the reaction disc contact surface 17f that determines the servo ratio SR and the reaction disc non-contact surface 17g. Because of this, by just the outer peripheral diameter of the reaction disc contact surface 17f that determines the servo ratio SR, it becomes possible to obtain plate plungers with a variety of servo ratios SR that are slightly different without having to change the dimensions of other portions of the plate plunger. Consequently, the servo ratio SR of the vacuum booster 1 can be made to efficiently and flexibly accommodate the requirements of a variety of different servo ratios and it becomes possible to inexpensively manufacture the vacuum booster 1.

Further, according to the brake system 20 of this example, the brake system 20 can efficiently and flexibly accommodate different servo ratios because it uses the vacuum booster 1 of this example, and thus there is a greater degree of freedom in designing brake characteristics.

Moreover, according to the plate plunger manufacturing method of this example, the method uses the plate plunger base material in which the outer peripheral diameter of the reaction disc contact surface 17f of the servo ratio determination surface 17c that determines the servo ratio SR has been set to the largest outer peripheral diameter D4 that sets the smallest servo ratio SR1 among the different servo ratios SR and in which common portions unrelated to the servo ratio SR have been set to common shapes and sizes. Additionally, by secondarily processing the servo ratio determination surface 17c of the plate plunger base material a slight predetermined amount by cutting or grinding, the outer peripheral diameter of the reaction disc contact surface 17f is set to an outer peripheral diameter corresponding to the desired servo ratio SR. Consequently, it suffices to manufacture a common plate plunger base material with respect to a variety of different servo ratios SR, so plate plungers 17 with a variety of different servo ratios SR can be easily manufactured and parts management also becomes easy.

Moreover, by using the common plate plunger base material, it becomes possible to make do with one mold for manufacturing the plate plunger 17 (the plate plunger base material) shown in FIG. 2A as the mold for manufacturing the plate plunger 17. Because of this, the costs of the plate plunger 17 can be reduced.

Moreover, as the common plate plunger base material, by using, as the plate plunger 17, the plate plunger base material in which the outer peripheral diameter of the reaction disc contact surface 17f is the largest outer peripheral diameter D4 that sets the smallest servo ratio SR, additional secondary processing such as cutting or grinding of the plate plunger 17 that sets the smallest servo ratio SR becomes unnecessary. Because of this, the plate plunger 17 can be manufactured even more easily and the cost of the plate plunger 17 can be reduced even more efficiently.

From the above, according to the plate plunger manufacturing method of this example, it becomes possible to efficiently and flexibly accommodate the requirements of plate plungers with a variety of servo ratios SR that are slightly different.

The present invention can be applied to anything as long as it is something that uses a plate plunger that determines a servo ratio SR. The point is that the present invention is capable of a variety of design changes within the scope of matters described in the claims.

The plate plunger manufacturing method, the vacuum booster, and the brake system pertaining to the present invention are suitably utilizable for a method of manufacturing a plate plunger that determines a servo ratio, a vacuum booster that uses vacuum to boost an input by a predetermined servo ratio resulting from this plate plunger and generate a large output, and a brake system that is equipped with the vacuum booster.

What is claimed is:

1. A method of manufacturing a plate plunger with which a reaction disc comes into contact and which determines a servo ratio of a vacuum booster, the plate plunger manufacturing method comprising:
   a) processing a plate plunger base material in a primary process in such a way that an outer peripheral diameter of a reaction disc contact surface of the plate plunger base material becomes equal to or greater than an outer peripheral diameter corresponding to the smallest servo ratio among a variety of different servo ratios; and
   b) forming the reaction disc contact surface of the plate plunger in a secondary process that is different from the primary process so that the outer peripheral diameter of the reaction disc contact surface corresponds to a desired servo ratio, wherein the secondary process includes removing material of the reaction disc contact surface to form a servo ratio determination surface that determines the servo ratio on a corner portion between an outer peripheral diameter of the plate plunger and a surface of the plate plunger that opposes the reaction disc.

2. The plate plunger manufacturing method according to claim 1, wherein the primary process is performed by mold forming or cut forming, and the secondary process is performed by cutting or grinding.

3. A method of manufacturing a vacuum booster including an input shaft to which an input is applied, a control valve that is operated by the input shaft, a power piston that operates on atmospheric air introduced by the operation of the control valve, an output shaft that puts out an output in which the input has been boosted by a servo ratio by the operation of the power piston, a reaction disc to which a reaction force of the output of the output shaft is transmitted and which elastically deforms, and a plate plunger with which the reaction disc that has elastically deformed comes into contact to transmit the reaction force to the input shaft and which determines the servo ratio, the method comprising
   a) processing a plate plunger base material in a primary process so that an outer peripheral diameter of a reaction disc contact surface of the plate plunger base material is equal to or greater than an outer peripheral diameter corresponding to the smallest servo ratio among a variety of different servo ratios,
   b) forming the reaction disc contact surface of the plate plunger in a secondary process that is different from the primary process so that the outer peripheral diameter of the reaction disc contact surface corresponds to a desired servo ratio, wherein the secondary process includes removing material of the reaction disc contact surface to form a servo ratio determination surface on a corner portion between an outer peripheral diameter of the plate plunger and a surface of the plate plunger that opposes the reaction disc, wherein the servo ratio determination surface is formed by an inclined surface and determines the servo ratio, and
   wherein the servo ratio determination surface includes the reaction disc contact surface that determines the servo ratio and a reaction disc non-contact surface.

4. The method of manufacturing a vacuum booster according to claim 3, wherein the primary process is performed by mold forming or cut forming, and the secondary process is performed by cutting or grinding.

5. The method of manufacturing a vacuum booster according to claim 3, wherein the primary process is performed by mold forming, and the secondary process is performed by grinding.

6. The method of manufacturing a vacuum booster according to claim 3, wherein the primary process is performed by mold forming, and the secondary process is performed by cutting.

7. The method of manufacturing a vacuum booster according to claim 3, wherein the primary process is performed by cut forming, and the secondary process is performed by grinding.

8. The method of manufacturing a vacuum booster according to claim 3, wherein the primary process is performed by cut forming, and the secondary process is performed by cutting.

9. A method of manufacturing a brake system including a brake pedal, a brake booster that boosts a pedal force of the brake pedal by a predetermined servo ratio and outputs the boosted pedal force, a master cylinder that operates on the output of the brake booster and generates hydraulic pressure, and brake cylinders that generate brake force with the hydraulic pressure generated in the master cylinder to apply brakes to wheels, wherein the brake booster includes an input shaft to which an input is applied, a control valve that is operated by the input shaft, a power piston that operates on atmospheric air introduced by the operation of the control valve, an output shaft that puts out an output in which the input has been boosted by a servo ratio by the operation of the power piston, a reaction disc to which a reaction force of the output of the output shaft is transmitted and which elastically deforms, and a plate plunger with which the reaction disc that has elastically deformed comes into contact to transmit the reaction force to the input shaft and which determines the servo ratio, the method comprising
   a) processing a plate plunger base material in a primary process so that an outer peripheral diameter of a reaction disc contact surface of the plate plunger base material is equal to or greater than an outer peripheral diameter corresponding to the smallest servo ratio among a variety of different servo ratios,
   b) forming the reaction disc contact surface of the plate plunger in a secondary process that is different from the primary process so that the outer peripheral diameter of the reaction disc contact surface corresponds to a desired servo ratio, wherein the secondary process includes removing material of the reaction disc contact surface to form a servo ratio determination surface on a corner portion between an outer peripheral diameter of the plate plunger and a surface of the plate plunger that opposes the reaction disc, wherein the servo ratio determination surface is formed by an inclined surface and determines the servo ratio, and wherein the servo ratio determination surface includes the reaction disc contact surface that determines the servo ratio and a reaction disc non-contact surface.

10. The method of manufacturing a brake system according to claim 9, wherein the primary process is performed by mold forming, and the secondary process is performed by grinding.

11. The method of manufacturing a brake system according to claim 9, wherein the primary process is performed by mold forming, and the secondary process is performed by cutting.

12. The method of manufacturing a brake system according to claim 9, wherein the primary process is performed by cut forming, and the secondary process is performed by grinding.

13. The method of manufacturing a brake system according to claim 9, wherein the primary process is performed by cut forming, and the secondary process is performed by cutting.

14. The method of manufacturing a brake system according to claim 9, wherein the primary process is performed by mold forming or cut forming, and the secondary process is performed by cutting or grinding.

* * * * *